(12) United States Patent
Matsumoto

(10) Patent No.: US 10,348,912 B2
(45) Date of Patent: Jul. 9, 2019

(54) MANAGEMENT SYSTEM, MANAGEMENT COMPUTER, AND RECORDING MEDIUM

(71) Applicant: Kyocera Document Solutions Inc., Osaka (JP)

(72) Inventor: Atsushi Matsumoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/145,761

(22) Filed: Sep. 28, 2018

(65) Prior Publication Data

US 2019/0098150 A1    Mar. 28, 2019

(30) Foreign Application Priority Data

Sep. 28, 2017 (JP) .................. 2017-188080

(51) Int. Cl.
 *H04N 1/00* (2006.01)
(52) U.S. Cl.
 CPC .................... *H04N 1/00344* (2013.01)

(58) Field of Classification Search
 CPC .......... H04N 1/00344; H04N 1/00127; H04N 1/00214; H04N 1/00217; H04N 2201/0008; H04N 2201/0044; H04N 2201/0094
 See application file for complete search history.

(56) References Cited

U.S. PATENT DOCUMENTS

2013/0139142 A1* 5/2013 Ikawa ................. G06F 3/12
                                                               717/170
2016/0350041 A1* 12/2016 Katano ................ G06F 3/1236

FOREIGN PATENT DOCUMENTS

JP          2004-289313 A      10/2004

* cited by examiner

*Primary Examiner* — Kent Yip
(74) *Attorney, Agent, or Firm* — HEA Law PLLC

(57) ABSTRACT

A management system includes a plurality of image forming apparatuses, a management computer, and a management server. The plurality of image forming apparatuses are arranged inside a common network. The management computer is arranged inside the network to manage the image forming apparatus. The management server is arranged outside the network to manage the image forming apparatus. The management computer transmits information on the image forming apparatus obtained from the image forming apparatus to the management server. The management server manages the information on the image forming apparatus received from the management computer.

5 Claims, 10 Drawing Sheets

MANAGEMENT SYSTEM, MANAGEMENT COMPUTER, AND RECORDING MEDIUM

INCORPORATION BY REFERENCE

This application is based upon, and claims the benefit of priority from, corresponding Japanese Patent Application No. 2017-188080, filed in the Japanese Patent Office on Sep. 28, 2017, and the entire contents of which are incorporated herein by reference.

BACKGROUND

Unless otherwise indicated herein, the description in this section is not prior art to the claims in this application and is not admitted to be prior art by inclusion in this section.

As a typical management system that manages an image forming apparatus, a management system that includes a plurality of image forming apparatuses arranged inside a common network, and a management server arranged outside this network to manage the image forming apparatuses has been known. In this management system, the image forming apparatus transmits information on the image forming apparatus to the management server. The information on the image forming apparatus includes, for example, information on remaining amounts of expendables in the image forming apparatus, information on presence/absence of a component needing to be replaced in the image forming apparatus, and information on abnormal occurrence in the image forming apparatus. Then, the management server manages the information on the image forming apparatus received from the image forming apparatus.

SUMMARY

A management system according to one aspect of the disclosure includes a plurality of image forming apparatuses, a management computer, and a management server. The plurality of image forming apparatuses are arranged inside a common network. The management computer is arranged inside the network to manage the image forming apparatus. The management server is arranged outside the network to manage the image forming apparatus. The management computer transmits information on the image forming apparatus obtained from the image forming apparatus to the management server. The management server manages the information on the image forming apparatus received from the management computer.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
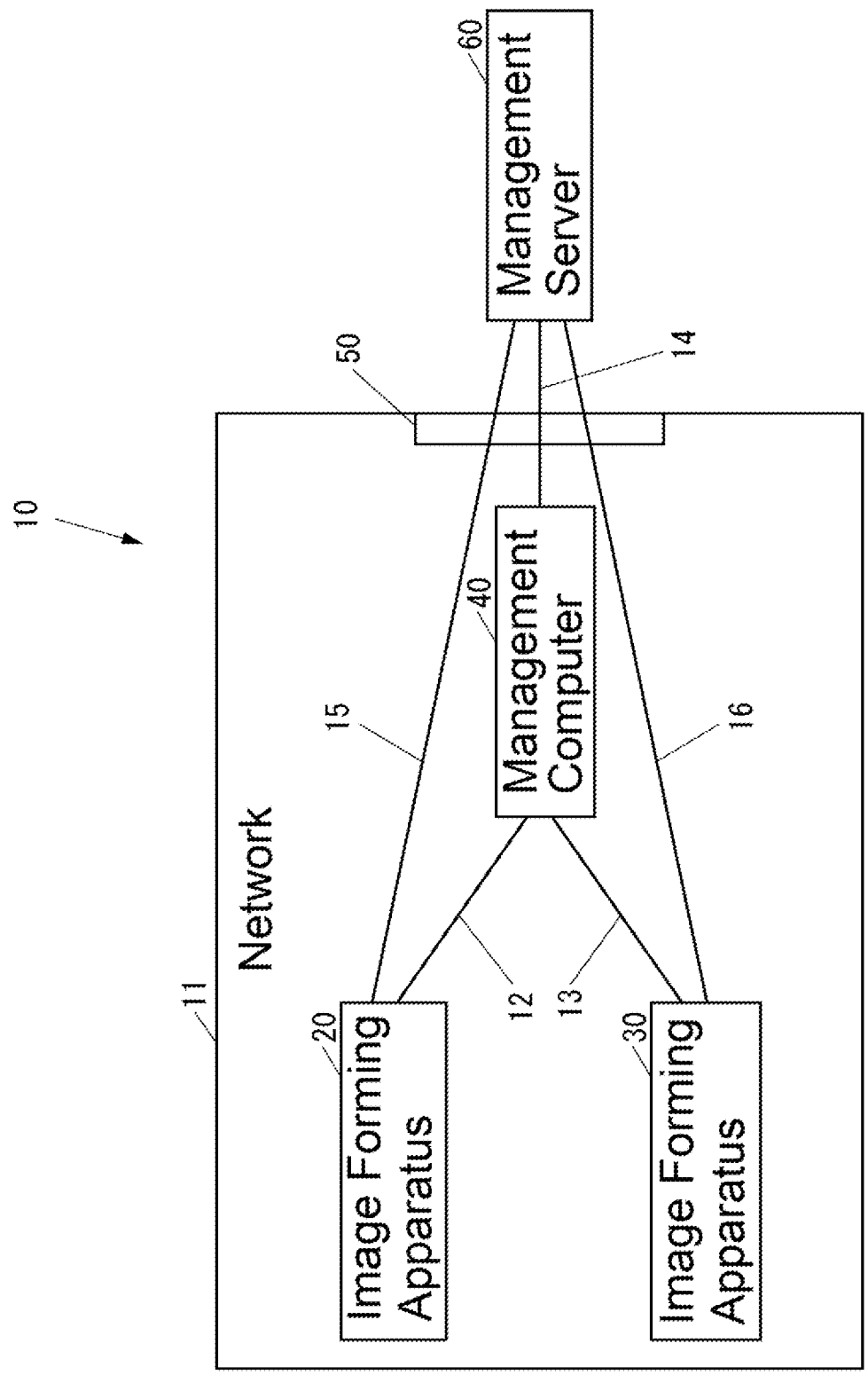
FIG. 1 illustrates a block diagram of a management system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure with reference to drawings.

First, a configuration of a management system according to one embodiment of the disclosure will be described.

FIG. 1 illustrates a block diagram of a management system 10 according to the embodiment.

As illustrated in FIG. 1, the management system 10 includes an image forming apparatus 20, an image forming apparatus 30 having a configuration similar to that of the image forming apparatus 20, and a management computer 40 that manages the image forming apparatus 20 and the image forming apparatus 30.

The image forming apparatus 20 and the image forming apparatus 30 are each, for example, a multifunction peripheral (MFP), a printer-only machine, a copy-only machine, a scanner-only machine, or a FAX-only machine.

The management computer 40 is, for example, a personal computer (PC).

The image forming apparatus 20, the image forming apparatus 30, and the management computer 40 are arranged inside a network 11 such as a local area network (LAN).

The management system 10 includes a firewall 50 inside the network 11. The firewall 50 controls communication between inside the network 11 and outside the network 11.

A Simple Network Management Protocol (SNMP) connection 12 can be established between the image forming apparatus 20 and the management computer 40. The SNMP connection 12 is a temporal connection with an SNMP as a protocol for the temporal connection. Similarly, an SNMP connection 13 as a connection with the SNMP can be established between the image forming apparatus 30 and the management computer 40.

The management system 10 can include at least one image forming apparatus having a configuration similar to that of the image forming apparatus 20 other than the image forming apparatus 20 and the image forming apparatus 30 inside the network 11.

The management computer 40 can manage a plurality of image forming apparatuses arranged inside the network 11. The management computer 40 receives information on the image forming apparatus (hereinafter referred to as "device information") from each of the managing image forming apparatuses via the SNMP connection to manage the received device information. Here, as the device information, for example, there is information on various errors, such as information on a system error that has occurred in the image forming apparatus, error information indicative of a paper jam that has occurred in the image forming apparatus, and error information indicative of a component failure that has occurred in the image forming apparatus. As the device information, for example, there is information on remaining amounts of expendables in the image forming apparatus. As the device information, for example, there is information on a current firmware version in the image forming apparatus. As the device information, for example, there is information on properties of the image forming apparatus, such as a model name, a host name, a media access control (MAC) address, and a serial number of the image forming apparatus.

The management system 10 includes a management server 60 that manages the image forming apparatus 20 and the image forming apparatus 30.

The management server 60 may be configured from one computer, or may be configured from a plurality of computers.

The management server 60 is arranged outside the network 11.

A Hypertext Transfer Protocol (HTTP) connection 14 can be established between the management computer 40 and the management server 60. The HTTP connection 14 is a temporal connection with an HTTP as a protocol for the temporal connection. In this description, the HTTP includes a Hypertext Transfer Protocol Secure (HTTPS).

An Extensible Messaging and Presence Protocol (XMPP) connection 15 can be established between the image forming apparatus 20 and the management server 60. The XMPP connection 15 is a constant connection with an XMPP as a protocol for a continuous connection, that is, the constant connection. When the XMPP connection 15 has been established, the image forming apparatus 20 can transmit information indicative of a connection state of the image forming apparatus 20 itself in the XMPP connection 15 to the management server 60 via the XMPP connection 15 in real-time, and the management server 60 can know the connection state of the image forming apparatus 20 in the XMPP connection 15 in real-time, based on the information transmitted from the image forming apparatus 20 via the XMPP connection 15.

Similarly, an XMPP connection 16 as the constant connection with the XMPP can be established between the image forming apparatus 30 and the management server 60. When the XMPP connection 16 has been established, the image forming apparatus 30 can transmit information indicative of a connection state of the image forming apparatus 30 itself in the XMPP connection 16 to the management server 60 via the XMPP connection 16 in real-time, and the management server 60 can know the connection state of the image forming apparatus 30 in the XMPP connection 16 in real-time, based on the information transmitted from the image forming apparatus 30 via the XMPP connection 16.

The management system 10 can include at least one network having a configuration similar to that of the network 11 other than the network 11.

The management server 60 can manage a plurality of image forming apparatuses included in the management system 10. The management server 60 receives, from the management computer inside each of the networks included in the management system 10, the device information managed by this management computer via the HTTP connection, and manages the received device information.

Figure 2:
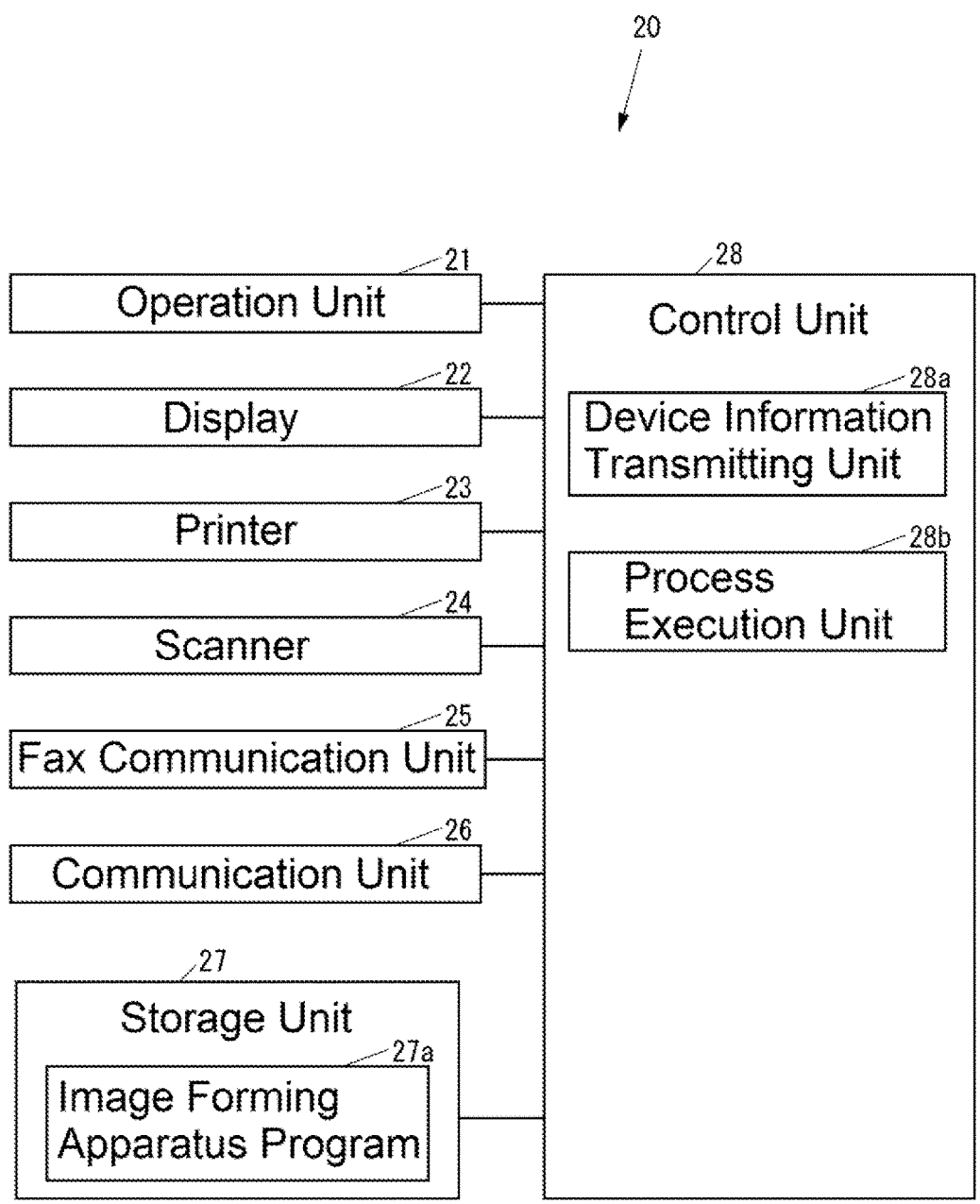
FIG. 2 illustrates a block diagram of an image forming apparatus according to the one embodiment when the image forming apparatus is an MFP.

FIG. 2 illustrates a block diagram of the image forming apparatus 20 when the image forming apparatus 20 is an MFP.

The image forming apparatus 20 illustrated in FIG. 2 includes an operation unit 21, a display 22, a printer 23, a scanner 24, a fax communication unit 25, a communication unit 26, a storage unit 27, and a control unit 28. The operation unit 21 is an input device such as a button to which various operations are input. The display 22 is a display device such as a liquid crystal display (LCD) that displays various kinds of information. The printer 23 is a print device that prints an image on a recording medium such as a paper sheet. The scanner 24 is a reading device that reads an image from an original document. The fax communication unit 25 is a fax device that performs fax communication with an external facsimile device (not illustrated) via a communication line such as a dial-up line. The communication unit 26 is a communication device that communicates with an external device via a network such as a LAN or the Internet, or directly by wire or wirelessly without the network. The storage unit 27 is a non-volatile storage device such as a semiconductor memory and a hard disk drive (HDD) that store various kinds of information. The control unit 28 controls the whole image forming apparatus 20.

The storage unit 27 stores an image forming apparatus program 27a. The image forming apparatus program 27a, for example, may be installed in the image forming apparatus 20 at production stage of the image forming apparatus 20, may be additionally installed in the image forming apparatus 20 from an external storage medium such as a universal serial bus (USB) flash drive, or may be additionally installed in the image forming apparatus 20 via the network.

The control unit 28 includes, for example, a central processing unit (CPU), a read-only memory (ROM) that stores a program and various data, and a random-access memory (RAM) used as a work area of the CPU. The CPU executes the program stored in the ROM or the storage unit 27.

The control unit 28 executes the image forming apparatus program 27a to ensure a device information transmitting unit 28a and a process execution unit 28b. The device information transmitting unit 28a transmits the device information of the image forming apparatus 20 to the management computer 40 (see FIG. 1) via the SNMP connection 12

(see FIG. 1). The process execution unit 28*b* executes a process corresponding to an operation by the management server 60 (see FIG. 1).

The image forming apparatus 30 (see FIG. 1) has a configuration similar to a configuration of the image forming apparatus 20. Thus, the image forming apparatus 30 will not be further elaborated here.

Figure 3:
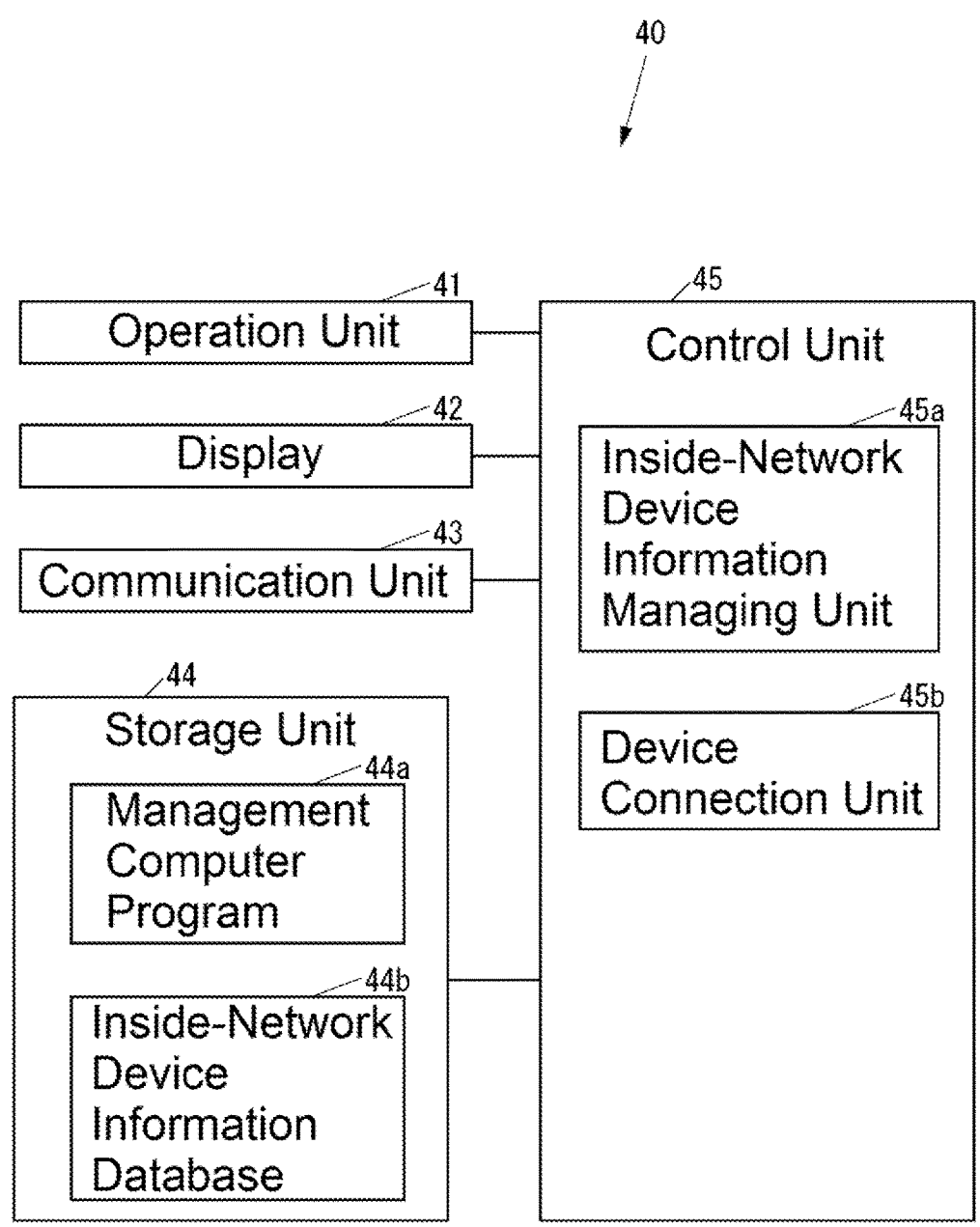
FIG. 3 illustrates a block diagram of a management computer according to the one embodiment.

FIG. 3 illustrates a block diagram of the management computer 40.

The management computer 40, as illustrated in FIG. 3, includes an operation unit 41, a display 42, a communication unit 43, a storage unit 44, and a control unit 45. The operation unit 41 is an input device such as a keyboard and a computer mouse to which various operations are input. The display 42 is a display device such as an LCD that displays various kinds of information. The communication unit 43 is a communication device that communicates with an external device via the network such as the LAN or the Internet, or directly by wire or wirelessly without the network. The storage unit 44 is a non-volatile storage device such as a semiconductor memory and an HDD that store various kinds of information. The control unit 45 controls the whole management computer 40.

The storage unit 44 stores a management computer program 44*a*. The management computer program 44*a*, for example, may be installed in the management computer 40 at production stage of the management computer 40, may be additionally installed in the management computer 40 from an external storage medium such as a USB flash drive, a compact disk (CD), and a digital versatile disk (DVD), or may be additionally installed in the management computer 40 via the network.

The storage unit 44 can store an inside-network device information database 44*b* to manage the device information of the image forming apparatus arranged inside the network 11 (see FIG. 1).

The control unit 45 includes, for example, a CPU, a ROM that stores a program and various data, and a RAM used as a work area of the CPU. The CPU executes the program stored in the ROM or the storage unit 44.

The control unit 45 executes the management computer program 44*a* to ensure an inside-network device information managing unit 45*a* and a device connection unit 45*b*. The inside-network device information managing unit 45*a* manages the device information of the image forming apparatus arranged inside the network 11. The device connection unit 45*b* connects the image forming apparatus arranged inside the network 11 to the management server 60 (see FIG. 1) via the XMPP connection.

Figure 4:
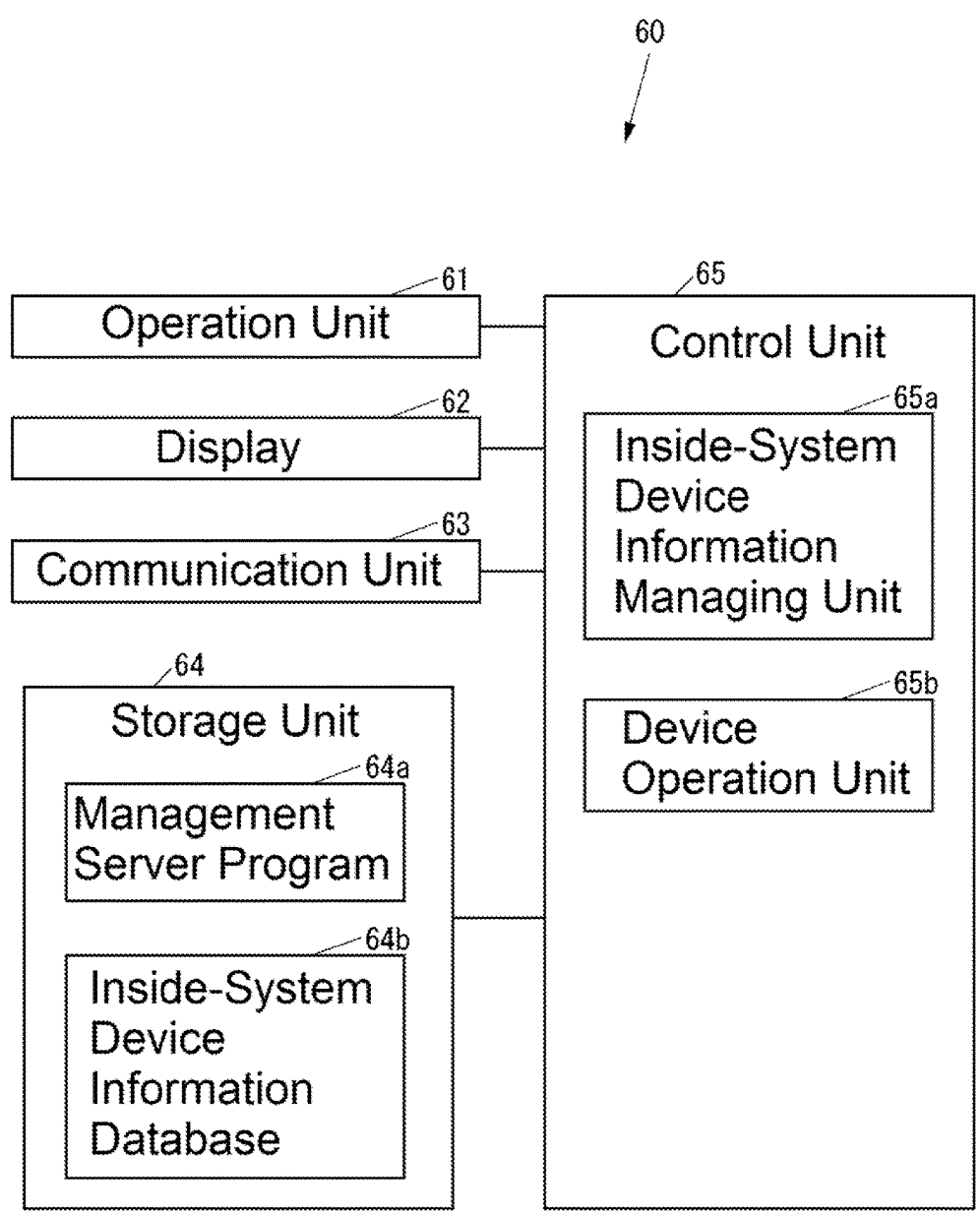
FIG. 4 illustrates a block diagram of a management server according to the one embodiment when the management server is achieved by one computer.

FIG. 4 illustrates a block diagram of the management server 60 when the management server 60 is achieved by one computer.

The management server 60 illustrated in FIG. 4 includes an operation unit 61, a display 62, a communication unit 63, a storage unit 64, and a control unit 65. The operation unit 61 is an input device such as a keyboard and a computer mouse to which various operations are input. The display 62 is a display device such as an LCD that displays various kinds of information. The communication unit 63 is a communication device that communicates with an external device via the network such as the LAN or the Internet, or directly by wire or wirelessly without the network. The storage unit 64 is a non-volatile storage device such as a semiconductor memory and an HDD that store various kinds of information. The control unit 65 controls the whole management server 60.

The storage unit 64 stores a management server program 64*a*. The management server program 64*a*, for example, may be installed in the management server 60 at production stage of the management server 60, may be additionally installed in the management server 60 from an external storage medium such as a USB flash drive, a CD, and a DVD, or may be additionally installed in the management server 60 via the network.

The storage unit 64 can store an inside-system device information database 64*b* to manage the device information of the image forming apparatus arranged inside the management system 10 (see FIG. 1).

The control unit 65 includes, for example, a CPU, a ROM that stores a program and various data, and a RAM used as a work area of the CPU. The CPU executes the program stored in the ROM or the storage unit 64.

The control unit 65 executes the management server program 64*a* to ensure an inside-system device information managing unit 65*a* and a device operation unit 65*b*. The inside-system device information managing unit 65*a* manages the device information of the image forming apparatus arranged inside the management system 10. The device operation unit 65*b* operates the image forming apparatus arranged inside the management system 10.

The following describes a behavior of the management system 10.

First, a description will be given of a behavior of the management system 10 when the image forming apparatus 20 is registered as a management object in the management server 60.

Figure 5:
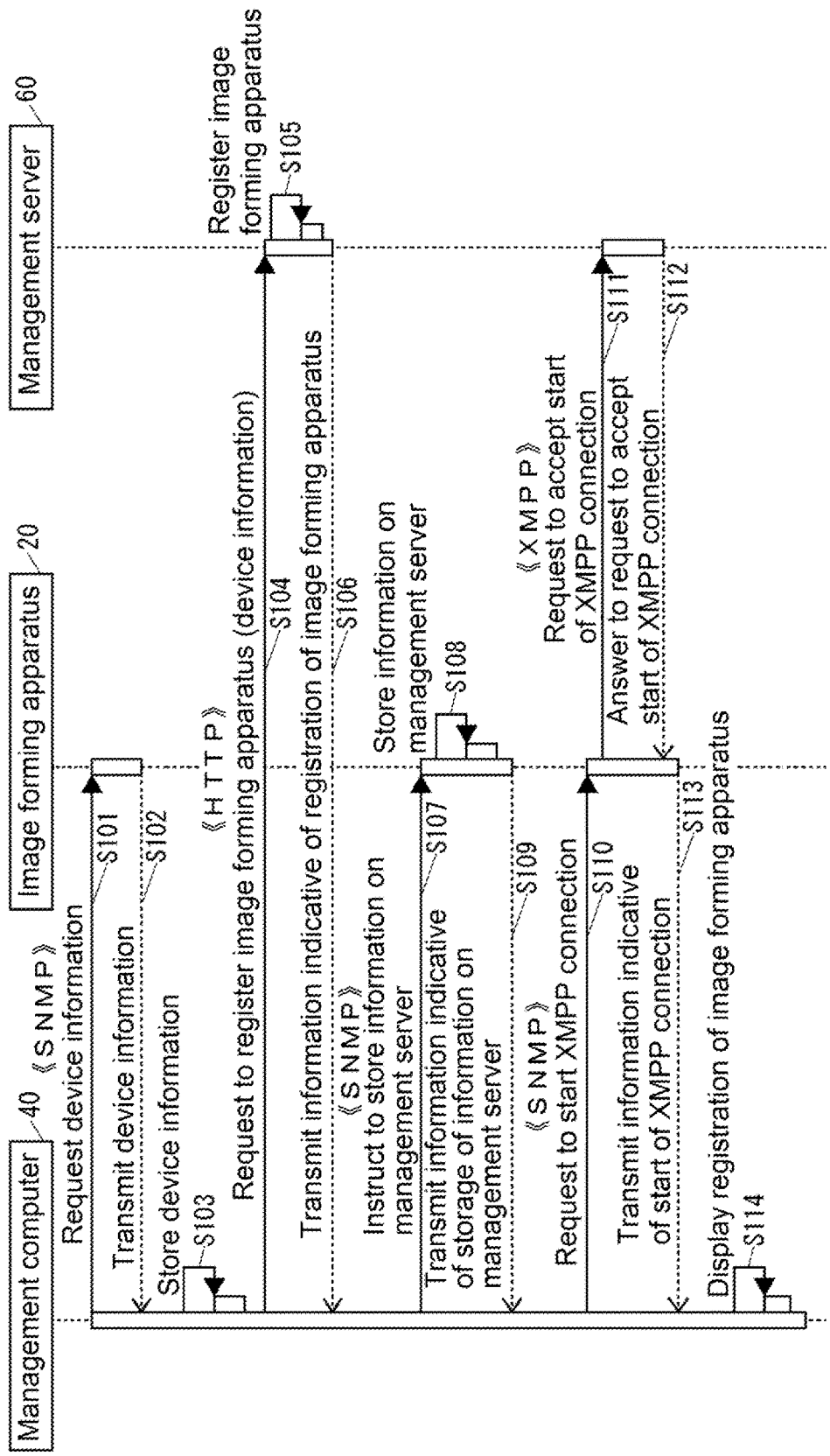
FIG. 5 illustrates a behavior of the management system according to the one embodiment when the image forming apparatus is registered as a management object in the management server.

FIG. 5 illustrates the behavior of the management system 10 when the image forming apparatus 20 is registered as the management object in the management server 60.

The control unit 45 of the management computer 40 executes the behavior illustrated in FIG. 5 when an instruction to register the image forming apparatus 20 as the management object in the management server 60 is input via the operation unit 41.

As illustrated in FIG. 5, the inside-network device information managing unit 45*a* of the management computer 40 requests the device information of the image forming apparatus 20 containing information required for the registration to the management server 60, from the image forming apparatus 20 via the SNMP connection 12 (Step S101).

When the device information transmitting unit 28*a* of the image forming apparatus 20 receives the request at Step S101, the device information transmitting unit 28*a* transmits the device information requested at Step S101 to the management computer 40 via the SNMP connection 12 (Step S102).

When the inside-network device information managing unit 45*a* of the management computer 40 receives the device information transmitted from the image forming apparatus 20 at Step S102, the inside-network device information managing unit 45*a* stores the received device information in the inside-network device information database 44*b* (Step S103). The inside-network device information managing unit 45*a* transmits the device information stored at Step S103 to the management server 60 via the HTTP connection 14 to request the management server 60 to register the image forming apparatus 20 as the management object (Step S104).

When the inside-system device information managing unit 65*a* of the management server 60 receives the device information transmitted from the management computer 40 at Step S104, the inside-system device information managing unit 65*a* stores the received device information in the inside-system device information database 64*b* to register the image forming apparatus 20 as the management object (Step S105). Then, the inside-system device information managing unit 65*a* transmits information that shows that the image forming apparatus 20 has been registered as the management object, to the management computer 40 via the HTTP connection 14 (Step S106).

When the device connection unit 45*b* of the management computer 40 receives the information transmitted from the management server 60 at Step S106, the device connection unit 45*b* transmits an instruction to store information on the management server 60 required to connect to the management server 60, to the image forming apparatus 20 via the SNMP connection 12 (Step S107).

When the process execution unit 28*b* of the image forming apparatus 20 receives the instruction transmitted from the management computer 40 at Step S107, the process execution unit 28*b* stores the information on the management server 60 included in the instruction transmitted from the management computer 40 at Step S107 in the storage unit 27 (Step S108). Then, the process execution unit 28*b* transmits information that shows that the information on the management server 60 has been stored, to the management computer 40 via the SNMP connection 12 (Step S109).

When the device connection unit 45*b* of the management computer 40 receives the information transmitted from the image forming apparatus 20 at Step S109, the device connection unit 45*b* requests the image forming apparatus 20 via the SNMP connection 12 to start the XMPP connection with the management server 60 (Step S110).

When the process execution unit 28*b* of the image forming apparatus 20 receives the request at Step S110 from the management computer 40, the process execution unit 28*b* requests the management server 60 to accept the start of the XMPP connection 15, using the information on the management server 60 stored in the storage unit 27 at Step S108 (Step S111).

When the device operation unit 65*b* of the management server 60 is requested to accept the start of the XMPP connection 15 by the image forming apparatus 20 at Step S111, the device operation unit 65*b* answers the request to accept the start of the XMPP connection 15 to the image forming apparatus 20 (Step S112).

As described above, the XMPP connection 15 is started.

When the process execution unit 28*b* of the image forming apparatus 20 receives the answer at Step S112 from the management server 60, the process execution unit 28*b* transmits information that shows that the XMPP connection 15 has been started, to the management computer 40 via the SNMP connection 12 (Step S113).

When the device connection unit 45*b* of the management computer 40 receives the information transmitted from the image forming apparatus 20 at Step S113, the device connection unit 45*b* displays that the image forming apparatus 20 has been registered as the management object in the management server 60, on the display 42 (Step S114).

The management computer 40 can register the image forming apparatus arranged inside the network 11, such as the image forming apparatus 30, as the management object in the management server 60, similarly to the image forming apparatus 20.

The following describes a behavior of the management system 10 when the management computer 40 obtains the device information of the image forming apparatus 20 from the image forming apparatus 20.

Figure 6:
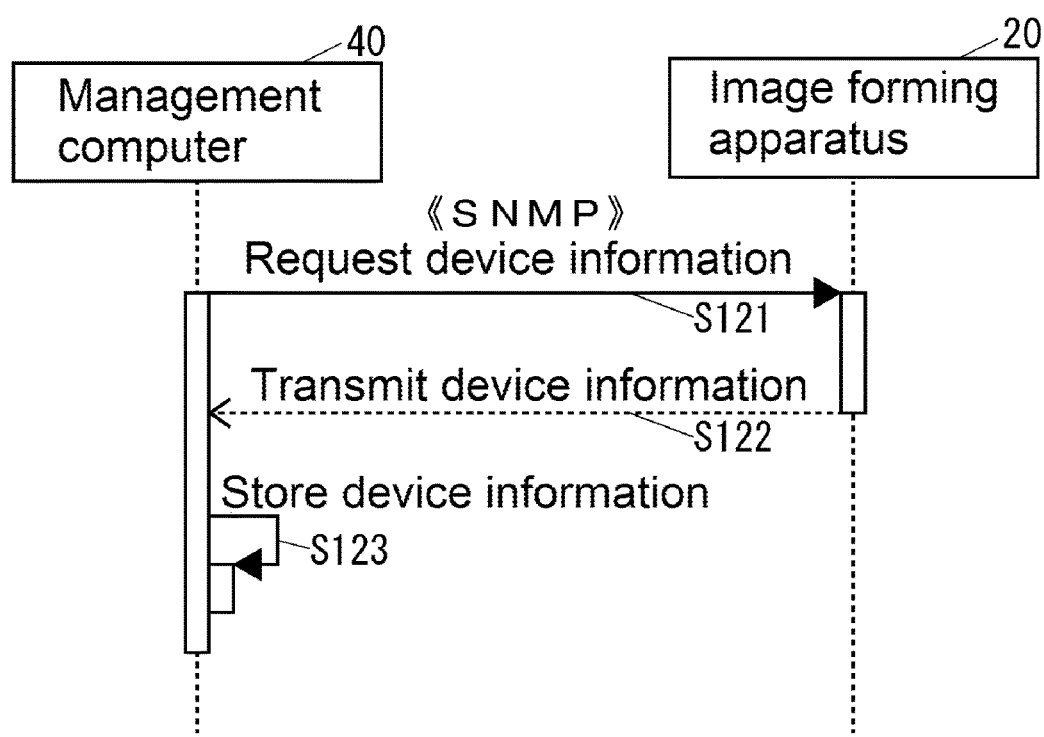
FIG. 6 illustrates a behavior of the management system according to the one embodiment when the management computer obtains device information of the image forming apparatus from the image forming apparatus.

FIG. 6 illustrates the behavior of the management system 10 when the management computer 40 obtains the device information of the image forming apparatus 20 from the image forming apparatus 20.

The inside-network device information managing unit 45*a* of the management computer 40 executes the behavior illustrated in FIG. 6 at a specific timing such as a periodic timing.

As illustrated in FIG. 6, the inside-network device information managing unit 45*a* requests the device information of the image forming apparatus 20 from the image forming apparatus 20 via the SNMP connection 12 (Step S121).

When the device information transmitting unit 28*a* of the image forming apparatus 20 receives the request at Step S121, the device information transmitting unit 28*a* transmits the device information of the image forming apparatus 20 to the management computer 40 via the SNMP connection 12 (Step S122).

When the inside-network device information managing unit 45*a* of the management computer 40 receives the device information transmitted from the image forming apparatus 20 at Step S122, the inside-network device information managing unit 45*a* stores the received device information in the inside-network device information database 44*b* (Step S123).

The management computer 40 can store the device information of the image forming apparatus arranged inside the network 11, such as the image forming apparatus 30, in the inside-network device information database 44*b*, similarly to the device information of the image forming apparatus 20.

The following describes a behavior of the management system 10 when the management computer 40 transmits the device information of the image forming apparatus arranged inside the network 11 to the management server 60.

Figure 7:
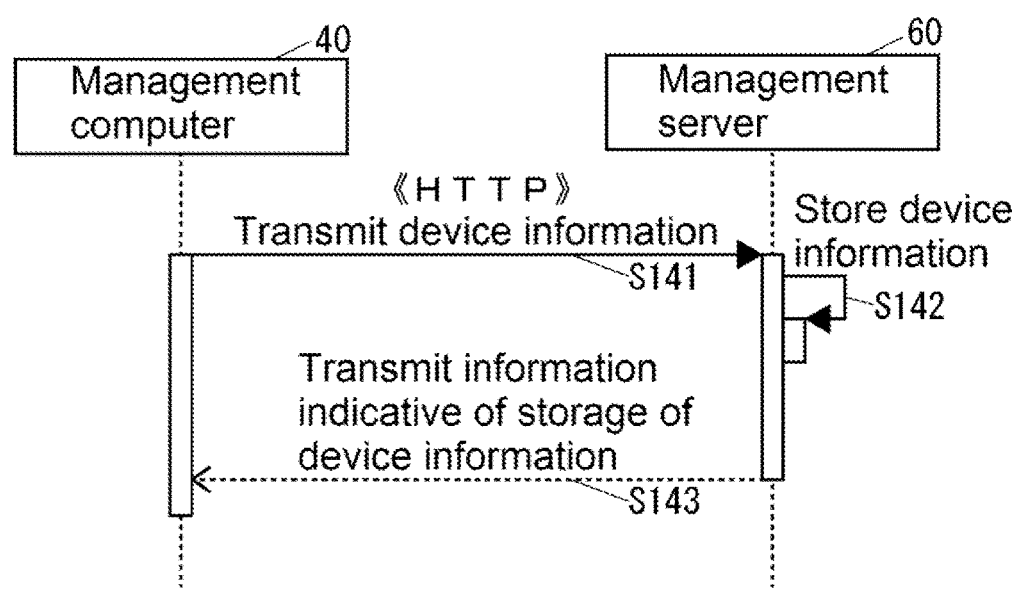
FIG. 7 illustrates a behavior of the management system according to the one embodiment when the management computer transmits device information of the image forming apparatus arranged inside the network, to the management server.

FIG. 7 illustrate the behavior of the management system 10 when the management computer 40 transmits the device information of the image forming apparatus arranged inside the network 11 to the management server 60.

The inside-network device information managing unit 45*a* of the management computer 40 executes the behavior illustrated in FIG. 7 at a specific timing such as a periodic timing.

As illustrated in FIG. 7, the inside-network device information managing unit 45*a* transmits the device information of the image forming apparatus arranged inside the network 11 to the management server 60 via the HTTP connection 14 (Step S141).

When the inside-system device information managing unit 65*a* of the management server 60 receives the information transmitted from the management computer 40 at Step S141, the inside-system device information managing unit 65*a* stores the received information in the inside-system device information database 64*b* (Step S142). Then, the inside-system device information managing unit 65*a* transmits information that shows that the device information of the image forming apparatus 20 has been stored in the inside-system device information database 64*b* to the management computer 40 (Step S143).

The following describes a behavior of the management computer 40 when a notice of the device information is given.

Figure 8:
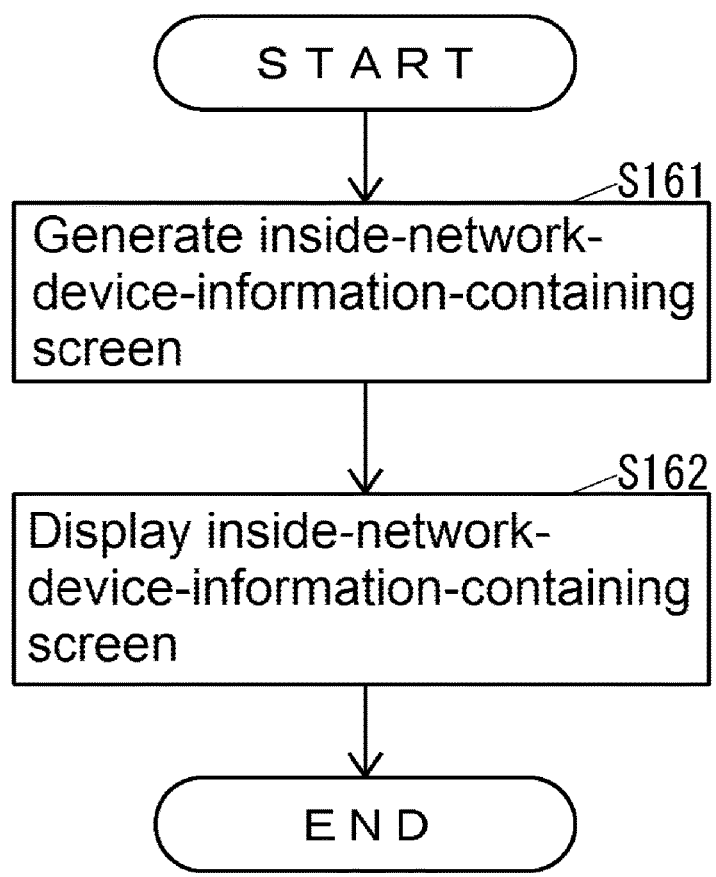
FIG. 8 illustrates a behavior of the management computer according to the one embodiment when a notice of the device information is given.

FIG. 8 illustrates the behavior of the management computer 40 when the notice of the device information is given.

The control unit 45 of the management computer 40 executes the behavior illustrated in FIG. 8 when an instruction to give notice of the device information is issued via the operation unit 41.

As illustrated in FIG. 8, the inside-network device information managing unit 45a of the management computer 40 generates a screen containing the device information (hereinafter referred to as an "inside-network-device-information-containing screen") for which the instruction has been issued via the operation unit 41 in the device information stored in the inside-network device information database 44b (Step S161).

Next, the inside-network device information managing unit 45a displays the inside-network-device-information-containing screen generated at Step S161 on the display 42 (Step S162), and then, ends the behavior illustrated in FIG. 8.

The management computer 40 receives the instruction to give notice of the device information via the operation unit 41 to display the inside-network-device-information-containing screen on the display 42 in the behavior illustrated in FIG. 8. However, the management computer 40 also can receive the instruction to give notice of the device information from a computer such as an external PC via the communication unit 43, not receiving the instruction via the operation unit 41. When the management computer 40 receives the instruction to give notice of the device information from the external computer, the management computer 40 may transmit the information on the inside-network-device-information-containing screen to a computer as a transmission source of the instruction to give notice of the device information via the communication unit 43, not displaying the inside-network-device-information-containing screen on the display 42.

The following describes a behavior of the management server 60 when a notice of the device information is given.

Figure 9:
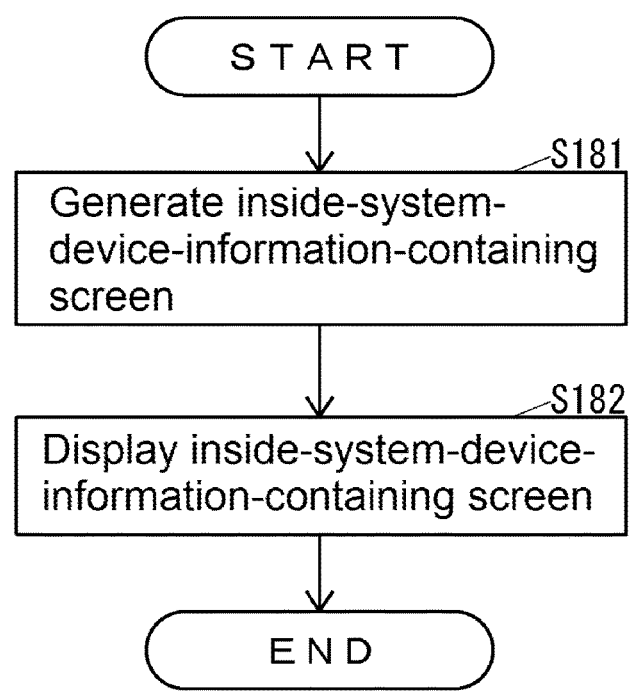
FIG. 9 illustrates a behavior of the management server according to the one embodiment when the notice of the device information is given.

FIG. 9 illustrates the behavior of the management server 60 when the notice of the device information is given.

The control unit 65 of the management server 60 executes the behavior illustrated in FIG. 9 when an instruction to give notice of the device information is issued via the operation unit 61.

As illustrated in FIG. 9, the inside-system device information managing unit 65a of the management server 60 generates a screen containing the device information (hereinafter referred to as an "inside-system-device-information-containing screen") for which the instruction has been issued via the operation unit 61 in the device information stored in the inside-system device information database 64b (Step S181).

Next, the inside-system device information managing unit 65a displays the inside-system-device-information-containing screen generated at Step S181 on the display 62 (Step S182), and then, ends the behavior illustrated in FIG. 9.

The management server 60 receives the instruction to give notice of the device information via the operation unit 61 to display the inside-system-device-information-containing screen on the display 62 in the behavior illustrated in FIG. 9. However, the management server 60 also can receive the instruction to give notice of the device information from a computer such as an external PC via the communication unit 63, not receiving the instruction via the operation unit 61. When the management server 60 receives the instruction to give notice of the device information from the external computer, the management server 60 may transmit the information on the inside-system-device-information-containing screen to a computer as a transmission source of the instruction to give notice of the device information via the communication unit 63, not displaying the inside-system-device-information-containing screen on the display 62.

The following describes a behavior of the management system 10 when the management server 60 operates the image forming apparatus 20 via the XMPP connection 15.

Figure 10:
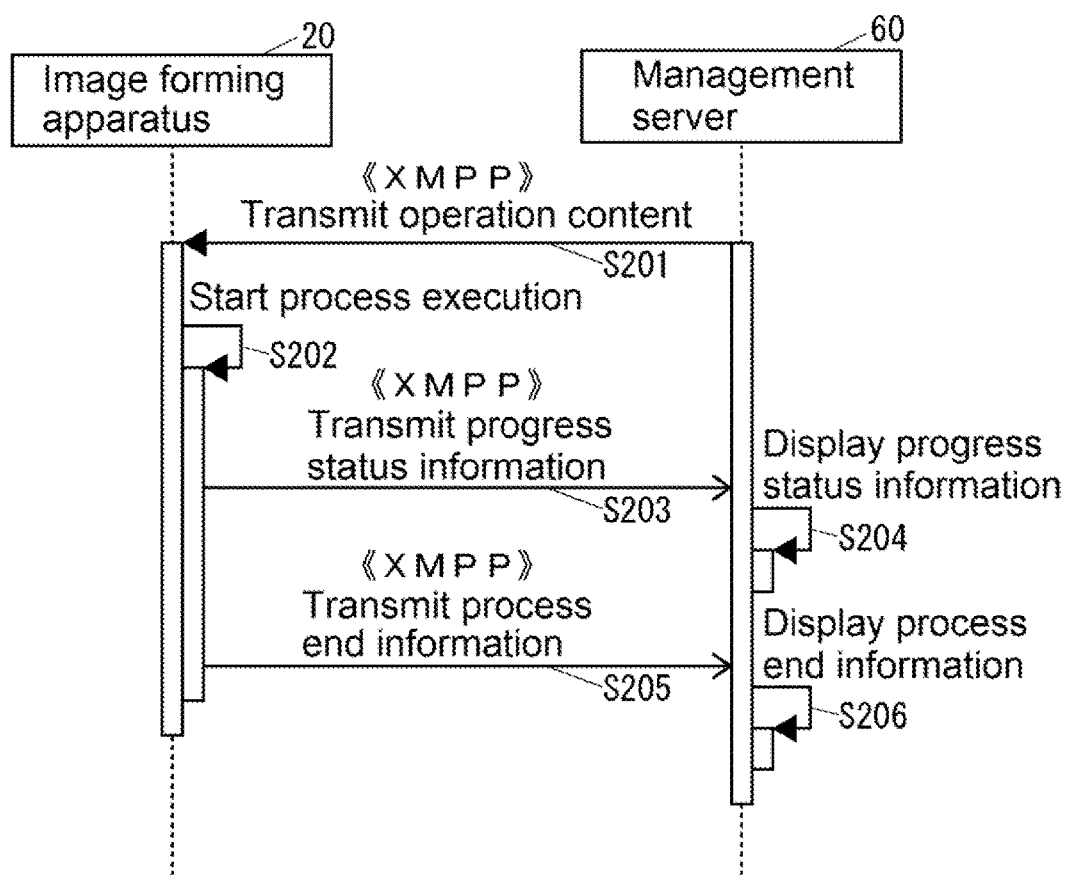
FIG. 10 illustrates a behavior of the management system according to the one embodiment when the management server operates the image forming apparatus via an XMPP connection.

FIG. 10 illustrate the behavior of the management system 10 when the management server 60 operates the image forming apparatus 20 via the XMPP connection 15.

The control unit 65 of the management server 60 executes the behavior illustrated in FIG. 10 when an instruction of an operation content with respect to the image forming apparatus 20 is issued from the operation unit 61 in a state where the XMPP connection 15 has been established with the image forming apparatus 20.

As illustrated in FIG. 10, the device operation unit 65b of the management server 60 transmits the operation content with respect to the image forming apparatus 20, for which the instruction is issued from the operation unit 61, to the image forming apparatus 20 via the XMPP connection 15 (Step S201).

When the process execution unit 28b of the image forming apparatus 20 receives the operation content transmitted from the management server 60 at Step S201, the process execution unit 28b starts an execution of a process corresponding to the received operation content (Step S202).

The process execution unit 28b transmits progress status information indicative of a degree of a process progression to the management server 60 via the XMPP connection 15 during execution of the process whose execution has been started at Step S202 (Step S203).

When the device operation unit 65b of the management server 60 receives the progress status information transmitted from the image forming apparatus 20 at Step S203, the device operation unit 65b displays the received progress status information on the display 62 (Step S204).

Steps S203 and S204 may be executed several times at a specific timing such as a periodic timing during the execution of the process whose execution has been started at Step S202.

When the process whose execution has been started at Step S202 is ended, the process execution unit 28b of the image forming apparatus 20 transmits process end information indicative of an end of the process to the management server 60 via the XMPP connection 15 (Step S205).

When the device operation unit 65b of the management server 60 receives the process end information transmitted from the image forming apparatus 20 at Step S205, the device operation unit 65b displays the received process end information on the display 62 (Step S206).

The management server 60 receives the instruction of the operation content with respect to the image forming apparatus 20 via the operation unit 61 to display the progress status information and the process end information on the display 62 in the behavior illustrated in FIG. 10. However, the management server 60 also can receive the instruction of the operation content with respect to the image forming apparatus 20 from a computer such as an external PC via the communication unit 63, not receiving the instruction via the operation unit 61. When the management server 60 receives the instruction of the operation content with respect to the image forming apparatus 20 from the external computer, the management server 60 may transmit the progress status information and the process end information to a computer as a transmission source of the instruction of the operation content with respect to the image forming apparatus 20 via the communication unit 63, not displaying the progress status information and the process end information on the display 62.

The management server 60 can operate the image forming apparatus included in the management system 10, such as the image forming apparatus 30, similarly to the image forming apparatus 20.

As described above, in the management system 10, the management computer 40 transmits the device information to the management server 60 on behalf of the plurality of image forming apparatuses (Step S141). This can reduce a risk of leakage of the device information, compared with a configuration where each of the plurality of image forming apparatuses transmits the device information to the management server 60. The device information includes information on the network 11, such as a host name and a MAC address of the image forming apparatus. Thus, it is beneficial to reduce the risk of the leakage of the device information.

In the management system 10, the management computer 40 transmits the device information to the management server 60 on behalf of the plurality of image forming apparatuses (Step S141). This can facilitate the setting of the firewall 50, compared with the configuration where each of the plurality of image forming apparatuses transmits the device information to the management server 60.

In the management system 10, the management computer 40 can give notice of the device information (Step S162). Thus, even a user who lacks authority to access the management server 60 can confirm the device information of the plurality of image forming apparatuses arranged inside the network 11 from the management computer 40. For example, a user of the image forming apparatus arranged inside the network 11 can confirm the inside-network-device-information-containing screen displayed on the display 42 to know situations of a number of printed sheets and a toner of the image forming apparatus arranged inside the network 11.

In the management system 10, the management server 60 can operate the image forming apparatus via the XMPP connection between the image forming apparatus and the management server 60. Thus, an administrator of the image forming apparatus such as a service person of the image forming apparatus can operate the image forming apparatus via the management server 60, for example, without directly operating the image forming apparatus by proceeding to an installation location of the image forming apparatus. This can improve a convenience of the operation with respect to the image forming apparatus.

For example, in the management system 10, the administrator of the image forming apparatus can remotely operate the image forming apparatus via the management server 60 when various problems such as a system error, a paper jam, and a component failure occur on the image forming apparatus. This improves a possibility that the problems occurred on the image forming apparatus are quickly solved.

In the management system 10, the management server 60 can give notice of the device information received at Step S141 from the management computer 40 by the management server 60 via the HTTP connection 14 between the management computer 40 and the management server 60 (Step S182). This can cause the administrator of the image forming apparatus to determine whether the image forming apparatus should be operated or not based on the notice by the management server 60 to improve the convenience.

In the embodiment, the management system 10 employs the SNMP and the HTTP as the protocols for the temporal connection. However, the management system 10 may employ protocols other than the SNMP and the HTTP as the protocols for the temporal connection.

In the embodiment, the management system 10 employs the XMPP as the protocol for the constant connection. However, the management system 10 may employ a protocol other than the XMPP as the protocol for the constant connection.

Exemplary Embodiment of the Disclosure

A management system of the disclosure includes a plurality of image forming apparatuses arranged inside a common network, a management computer arranged inside the network to manage the image forming apparatus, and a management server arranged outside the network to manage the image forming apparatus. The management computer transmits information on the image forming apparatus obtained from the image forming apparatus to the management server. The management server manages the information on the image forming apparatus received from the management computer.

According to this configuration, in the management system of the disclosure, the management computer transmits the information on the image forming apparatus to the management server on behalf of the plurality of image forming apparatuses. This can reduce the risk of leakage of the information on the image forming apparatus, compared with the configuration where each of the plurality of image forming apparatuses transmits the information on the image forming apparatus to the management server.

In the management system of the disclosure, the management computer may be configured to manage the information on the image forming apparatus obtained from the image forming apparatus and give notice of it.

With this configuration, in the management system of the disclosure, the management computer can give notice of the information on the image forming apparatus. Thus, even the user who lacks authority to access the management server can confirm the information on the plurality of image forming apparatuses arranged inside the common network from the management computer.

In the management system of the disclosure, the management server may be configured to operate the image forming apparatus via a constant connection with the image forming apparatus with a protocol for the constant connection.

With this configuration, in the management system of the disclosure, the management server can operate the image forming apparatus via the constant connection between the image forming apparatus and the management server. Thus, the administrator of the image forming apparatus can operate the image forming apparatus via the management server without directly operating the image forming apparatus by proceeding to the installation location of the image forming apparatus. This can improve the convenience.

A management computer of the disclosure is a management computer arranged inside a common network of a plurality of image forming apparatuses arranged inside the common network, so as to manage the image forming apparatus. The management computer transmits information on the image forming apparatus obtained from the image forming apparatus to a management server arranged outside the network to manage the image forming apparatus.

According to this configuration, the management computer of the disclosure transmits the information on the image forming apparatus to the management server on behalf of the plurality of image forming apparatuses. This can reduce the risk of leakage of the information on the image forming apparatus, compared with the configuration where each of the plurality of image forming apparatuses transmits the information on the image forming apparatus to the management server.

A management computer program of the disclosure is a management computer program executed by a management computer arranged inside a common network of a plurality of image forming apparatuses arranged inside the common network to manage the image forming apparatus. The management computer program causes the management computer to achieve a function to transmit information on the image forming apparatus obtained from the image forming apparatus to a management server arranged outside the network to manage the image forming apparatus.

According to this configuration, the management computer that executes the management computer program of the disclosure transmits the information on the image forming apparatus to the management server on behalf of the plurality of image forming apparatuses. This can reduce the risk of the leakage of the information on the image forming apparatus, compared with the configuration where each of the plurality of image forming apparatuses transmits the information on the image forming apparatus to the management server.

Effect of the Disclosure

The management system, the management computer, and the management computer program of the disclosure can reduce the risk of the leakage of the information on the image forming apparatus.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A management system comprising:
a plurality of image forming apparatuses arranged inside a common network;
a management computer arranged inside the network to manage the image forming apparatus, the management computer including a display; and
a management server arranged outside the network to manage the image forming apparatus; wherein
a Simple Network Management Protocol (SNMP) connection is established between the management computer and each of the plurality of image forming apparatuses, the SNMP connection being a temporal connection with an SNMP as a protocol for the temporal connection,
a Hypertext Transfer Protocol (HTTP) connection is establish between the management server and the management computer, the HTTP connection being a temporal connection with an HTTP as protocol for the temporal connection,
an Extensible Messaging and Presence Protocol (XMPP) connection is establish between the management server and each of the plurality of image forming apparatuses, the XMPP connection being a constant connection with an XMPP as a protocol for a continuous connection,
the management computer transmits information on the image forming apparatus obtained from the image forming apparatus to the management server via the HTTP connection, the management computer obtaining the information on the image forming apparatus from the image forming apparatus via the SNMP connection,
the management server manages the information on the image forming apparatus received from the management computer,
the management computer requests, via the SNMP connection, the image forming apparatus to connect to the management server, and the image forming apparatus connects to the management server via the XMPP connection, thereby the management computer manages the information on the image forming apparatus that is being managed by the management server, and
the display of the management computer displays the obtained information on the image forming apparatus.

2. The management system according to claim 1, wherein the management computer comprises an input device,
the management computer manages device information of the image forming apparatus arranged inside the network and transmits the device information of the image forming apparatus to the management server via the HTTP connection at a specific timing, and
when an instruction to give notice of the device information is issued via the input device, the management computer generates a screen containing the device information for which the instruction is issued, and displays the screen on the display.

3. The management system according to claim 1, wherein the management server comprises (i) an input device and (ii) a display,
the management server operates the image forming apparatus and transmits an operation content with respect to the image forming apparatus, for which an instruction is issued from the input device, to the image forming apparatus via the XMPP connection,
the image forming apparatus i) receives the operation content, ii) performs a process corresponding to the received operation content, and iii) transmits progress status information indicative of a degree of a process progression to the management server via the XMPP connection, and
the management server receives the progress status information and displays the received progress status information on the display.

4. A management computer, wherein:
the management computer is arranged inside a common network of a plurality of image forming apparatuses arranged inside the common network, so as to manage the image forming apparatus; and
the management computer is configured to:
(i) receive information on the image forming apparatus via a Simple Network Management Protocol (SNMP) connection established between the management computer and the image forming apparatuses, the SNMP connection being a temporal connection with an SNMP as a protocol for the temporal connection,
(ii) transmit the information on the image forming apparatus obtained from the image forming apparatus, via a Hypertext Transfer Protocol (HTTP) connection, to a management server, which is arranged outside the network, to manage the image forming apparatus, the HTTP connection being establish between the management server and the management computer and being a temporal connection with an HTTP as protocol for the temporal connection, and
(iii) request, via the SNMP connection, the image forming apparatus so that the image forming apparatus connects to the management server via an Extensible Messaging and Presence Protocol (XMPP) connection, thereby the management computer manages the information on the image forming apparatus that is being managed by the management server, the XMPP connection being a constant connection with an XMPP as a protocol for a continuous connection.

5. A non-transitory computer-readable recording medium that stores a management computer program, wherein:

the management computer program is executed by a management computer arranged inside a common network of a plurality of image forming apparatuses arranged inside the common network to manage the image forming apparatus; and the management computer program causes the management computer to achieve functions to:

(i) receive information on the image forming apparatus via a Simple Network Management Protocol (SNMP) connection established between the management computer and the image forming apparatuses, the SNMP connection being a temporal connection with an SNMP as a protocol for the temporal connection, (ii) transmit the information on the image forming apparatus obtained from the image forming apparatus, via a Hypertext Transfer Protocol (HTTP) connection, to a management server, which is arranged outside the network, to manage the image forming apparatus, the HTTP connection being establish between the management server and the management computer and being a temporal connection with an HTTP as protocol for the temporal connection, and (iii) request, via the SNMP connection, the image forming apparatus so that the image forming apparatus connects to the management server via an Extensible Messaging and Presence Protocol (XMPP) connection, thereby the management computer manages the information on the image forming apparatus that is being managed by the management server, the XMPP connection being a constant connection with an XMPP as a protocol for a continuous connection.

* * * * *